G. W. ZIEGLER.
Car Brake.
No. 20,237.
Patented May 11, 1858.
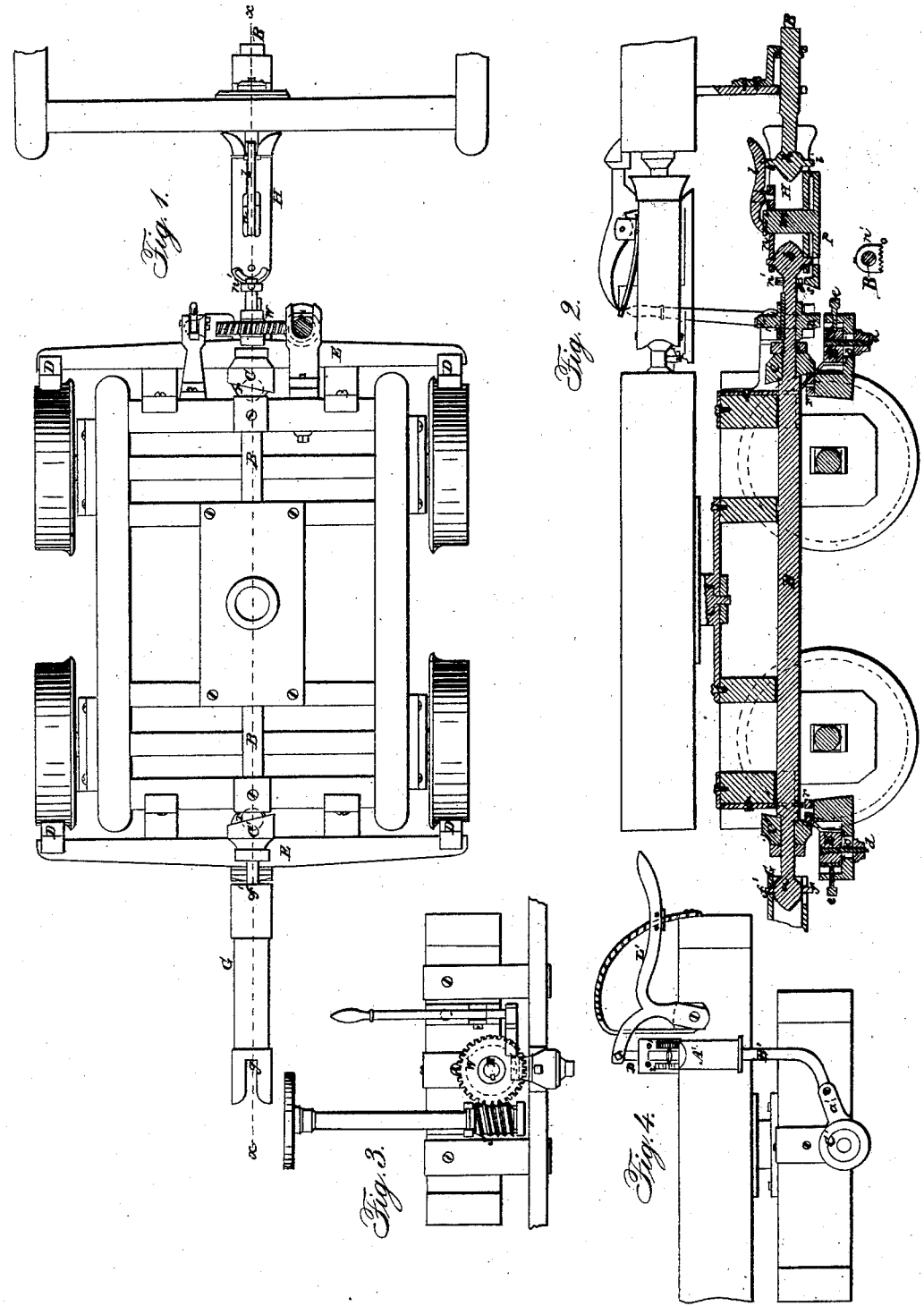

UNITED STATES PATENT OFFICE.

GEO. W. ZEIGLER, OF TIFFIN, OHIO.

RAILROAD-CAR BRAKE.

Specification of Letters Patent No. 20,237, dated May 11, 1858.

*To all whom it may concern:*

Be it known that I, GEORGE W. ZEIGLER, of Tiffin, in the county of Seneca and State of Ohio, have invented a new and useful Improvement in Railroad-Car Brakes; and I do hereby declare that the following is a full, clear, and exact description of the construction and operation of the same, reference being had to the annexed drawing, forming part of this specification, in which—

Figure 1 is a plan view of car truck with my brake attached. Fig. 2 is a vertical section on line *x x*, with side elevation of car platform and couplings to show relative position of the several parts. Fig. 3 is an end elevation of truck frame and parts connected therewith. Fig. 4 is an end elevation of car platform and truck frame showing graduated brake operator.

Similar characters of reference in the several figures denote the same part.

The nature of my invention consists in the application of power to the wheels through the rotation of a rod system continuous throughout the train, as hereinafter to be set forth. And in so applying the power to this rotary system, that the operator may always graduate the applied pressure, to the resistance to be overcome, and the circumstances under which this resistance is acting.

The details of construction and operation will readily be understood from the following description and reference to the drawing.

With my improvement, the usual construction of truck, wheels, rubber blocks, and bar to which pressure is applied, are employed. All of which will be recognized in the drawing without a definite description.

Suspended under each truck, so as to be immovable longitudinally, is a bar B, terminated by knobs *a* and *b*. This bar runs through the middle of the truck and has upon its extremities the cams C C', which, by the rotation of this bar press against rollers *r r'* and force the rubber blocks D against the wheels. This roller *r* is at the head of one branch of a fork secured to, and embracing the rubber bar E (Fig. 2), so that pressure against the roller applies the brake rubbers secured to the bar embraced by the fork. The position of this roller relative to the surface of the cam is adjustable by reason of slot *c*, bolt *d* and screw *e*, as shown in Fig. 2. It is thus seen that in any one truck the rubbers are applied by the rotation of its rod or bar B. The rods of the two trucks under the same car are connected by the piece G. The pins *f f'* of one rod being connected with it as shown in Fig. 2, and the pins of the other rod passing into the slots *g* permit all necessary movement of the trucks, while the rotation of one rod is duly communicated to the other.

Between the rods of two cars there is a coupling H, made up of a tube slotted at one end for the entrance of pins *i* of knob *h*, and with two holes in the other extremity to attach the tube to knob *b*, as shown in Fig. 2.

Passing vertically through the coupling tube H is a slide *m*, with an upward tendency communicated by spring *n*; and forced down by lever *l*. Outside of the tube, and attached to the slide *m*, is a bar *p* with an upward projecting knife edge *s*, at its extremity. Secured to the bar B, is a collar *n'*, with a small rack *o* upon one side, similar to that shown above in Fig. 2, for the car coupling.

When the cars are uncoupled, the bar *p* is closed against the tube H, and knife edge *s* enters the rack *o*. The coupling H may thus be held rigid at any angle to receive the knob *h* of the car to be coupled. As this knob enters the mouth of the coupling, its upper pin *i* acts upon lever *l* and forces the several parts into the position shown in Fig. 2. The coupling then offers no obstruction to the free movement of the cars, and when power is applied to rotate the bar under one car, it is immediately communicated to all the bars of the system coupled as described.

It will thus be seen that a train of cars with this brake apparatus can have all necessary movement between themselves, and the brakes be simultaneously applied, by power rotating any portion of the system. This rotation of the rod may be produced by the screw S and wheel W as indicated in Fig. 3. But, for many reasons known to rail-road men, it is advisable that the pressure applied may be known, hence I design to rotate the system as indicated in Fig. 4, where C' is the cam, to an arm *a'* of which is connected a lever L', through the cylinder A' secured to rod B', and the rod D' acting against a spring in the cylinder similar to the action of a spring weighing machine. This last rod has an index denoting upon the scales 1, 2, &c., the number of pounds pressure applied. The numbers above the scales denote the number of cars in the train, so that the operator will force down lever L' until the index denotes the required pressure on the scale for the number of cars in the train. A table will be prepared showing the requisite pressure under the several circumstances governing it, the details of which need not be entered into here.

Having described my invention and the operation thereof what I claim as new and desire to secure by Letters Patent, is—

1. The application of pressure to the rubbers by a longitudinal rotary rod under the truck, combined with cams C C', arranged and operating substantially as described.

2. I also claim, in combination with the rods and cams of the several cars, as described, the universal joint coupling H, constructed and operating substantially as specified, to connect the aforesaid rods throughout the train.

3. I further claim, transmitting the power to rotate the rods, through a spring indicating apparatus, substantially as, and for the purpose specified.

In testimony whereof, I have hereunto signed my name before two subscribing witnesses.

GEO. W. ZEIGLER.

Witnesses:
  GEO. PATTEN,
  JOHN S. HOLLINGSHEAD.